(12) United States Patent
Megginson et al.

(10) Patent No.: US 10,038,831 B2
(45) Date of Patent: *Jul. 31, 2018

(54) LIGHTING DEVICES CONFIGURABLE FOR GENERATING A VISUAL SIGNATURE

(71) Applicant: ABL IP HOLDING LLC, Conyers, GA (US)

(72) Inventors: Daniel M. Megginson, Fairfax, VA (US); Sean P. White, Reston, VA (US); Jenish S. Kastee, South Riding, VA (US); Januk S. Aggarwal, Tysons Corner, VA (US); David P. Ramer, Reston, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/634,264

(22) Filed: Jun. 27, 2017

(65) Prior Publication Data

US 2018/0063391 A1    Mar. 1, 2018

Related U.S. Application Data

(63) Continuation of application No. 15/245,318, filed on Aug. 24, 2016, now Pat. No. 9,723,693.

(51) Int. Cl.
*H04N 5/225*    (2006.01)
*H04N 5/232*    (2006.01)
(Continued)

(52) U.S. Cl.
CPC ....... *H04N 5/2256* (2013.01); *G06K 9/00369* (2013.01); *G06K 9/00771* (2013.01);
(Continued)

(58) Field of Classification Search
CPC .......... H04N 5/2256; H04N 5/523206; H04N 7/183; G06K 9/00369; G06K 9/00771; G06K 9/6202
(Continued)

(56) References Cited

U.S. PATENT DOCUMENTS 5,649,032 A    7/1997 Burt
9,426,430 B2   8/2016 Aguilar et al.
(Continued)

OTHER PUBLICATIONS

Entire prosecution history of U.S. Appl. No. 15/245,318, filed Aug. 24, 2016, titled "Lighting Devices Configurable for Generating a Visual Signature."

*Primary Examiner* — Dylan White
(74) *Attorney, Agent, or Firm* — RatnerPrestia

(57) ABSTRACT

A lighting device includes a light source, an image sensor, a controller, a memory, and a wireless transceiver. The light source is configured to emit light for general illumination. The image sensor is configured to acquire an image of an area illuminated by the light source. The controller is coupled to control the image sensor and to receive the acquired image of the illuminated area from the image sensor. The controller is configured to operate the wireless transceiver to receive identification information from a wireless device in the illuminated area. The controller is further configured to automatically generate a visual signature based on image information of a person or object, obtained from the image of the illuminated area. The controller also is configured to store the visual signature of the person or object in the memory in association with the wireless device identification information.

21 Claims, 6 Drawing Sheets

(51) Int. Cl.
  *H04N 7/18* (2006.01)
  *G06K 9/00* (2006.01)
  *G06K 9/62* (2006.01)
(52) U.S. Cl.
  CPC ....... *G06K 9/6202* (2013.01); *H04N 5/23206* (2013.01); *H04N 7/183* (2013.01)
(58) Field of Classification Search
  USPC ........................................................ 315/149
  See application file for complete search history.

(56) References Cited

U.S. PATENT DOCUMENTS

| | | |
|---|---|---|
| 9,723,693 B1* | 8/2017 | Megginson ........ H05B 37/0227 |
| 2013/0293877 A1 | 11/2013 | Ramer et al. |
| 2014/0354160 A1 | 12/2014 | Aggarwal et al. |
| 2015/0147067 A1 | 5/2015 | Ryan et al. |
| 2016/0189416 A1 | 6/2016 | Naguib et al. |
| 2016/0242252 A1 | 8/2016 | Lim et al. |
| 2016/0345414 A1 | 11/2016 | Nolan et al. |

* cited by examiner

LIGHTING DEVICES CONFIGURABLE FOR GENERATING A VISUAL SIGNATURE

CROSS REFERENCE TO RELATED APPLICATIONS

This application is a Continuation of application Ser. No. 15/245,318 filed Aug. 24, 2016, the entire contents of which are hereby incorporated herein by reference.

TECHNICAL FIELD

The disclosed subject matter relates to lighting devices, and to configurations and/or operations thereof, whereby a lighting device having a light source, an image sensor, and a wireless transceiver is configurable to generate a visual signature for a person or object, e.g. for storage or processing in association with an identifier of a mobile device as may be used or carried with the person or object.

BACKGROUND

Electrically powered artificial lighting has become ubiquitous in modern society. Electrical lighting devices or luminaires, such as light fixtures or lamps, are commonly deployed, for example, in homes, buildings of commercial and other enterprise establishments, as well as in various outdoor settings. Multiple luminaires may be linked in their operation in order to provide general illumination to an entire region, such as an entire floor of an office or commercial establishment.

In traditional lighting systems, luminaires performed no function in addition to the general illumination of an area to which they are directed. Because illumination is usually expected throughout an inhabited area, luminaires are commonly distributed to cover the entirety of a room, floor, or building. This complete coverage by luminaires provides the potential for using systems of luminaires to monitor or otherwise acquire information about an inhabited area.

Recently, lighting devices have been developed that include sensors, e.g. for detecting changes in ambient conditions such as temperature, light level, motion, or other data about the surrounding environment. Such lighting devices, for example, may use this data in order to change one or more characteristics of the light being emitted by the lighting device (such as turning lights on when a person enters an area). Such sensed data may also be used for non-lighting or non-control purposes.

Nonetheless, there may be room for still further improvement in the use of luminaire systems to acquire and manage information about an area being illuminated.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

Figure 1A:
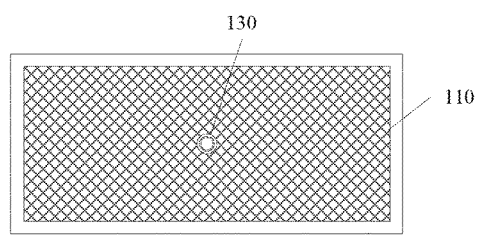
FIG. 1A is a plan view (e.g. as if viewed from a space to be illuminated) of an example of a lighting device with an included image sensor.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The concepts disclosed herein improve over the art by providing lighting devices that acquire visual information and identification information for an area under illumination, e.g. for monitoring and/or tracking purposes.

The detailed description below and the accompanying drawings disclose examples of lighting devices, and systems and methods employing such lighting devices. In one such example, a lighting device may include a light source, an image sensor, a controller, a memory, and a wireless transceiver. The light source is configured to emit light for general illumination of an area. The image sensor is configured to acquire an image of the area illuminated by the light source. The controller controls the image sensor to receive the image of the area illuminated by the light source acquired by the image sensor. The controller is configured to operate the wireless transceiver to receive identification information from a wireless device in the area illuminated by the light source. The controller is further configured to automatically generate a visual signature comprising image information of a person or object obtained from the image of the area illuminated by the light source, The controller is also configured to store the visual signature of the person or object in the memory in association with the wireless device identification information.

The elements of the lighting device may be combined together in one relatively integral unit, e.g. in a luminaire. Alternatively, the elements of the device may be somewhat separate from each other, e.g. with the controller and possibly the memory separate from the light source and the image sensor.

The controller in some examples generates the visual signature automatically, i.e. without the necessity of a signal or instruction from a human operator. For example, the controller may generate a visual signature whenever a wireless device is identified in the area illuminated by the light source. For another example, the controller may generate a visual signature whenever a person or object is identified in the area illuminated by the light source.

The controller may be particularly capable of detecting and identifying a person or object in the image of the area illuminated by the light source. Sensors such as motion sensors or thermal sensors may be utilized to detect a person or object in the area under illumination. Alternatively, consecutive images may be reviewed for differences which are caused as a person or object moves through the area under illumination.

Examples discussed below also encompass systems and methods for operating or controlling multiple luminaires or other lighting devices, in order to coordinate the acquisition of visual information and identification information across an entire inhabitable area. In these examples, luminaires may be connected by a communication network that facilitates the exchange of data between luminaires as the subject of the visual signature traverses the inhabitable area.

Examples discussed below and shown in the drawings improve over the art by enabling the monitoring or tracking of persons or objects in an illuminated environment. The ability to identify and/or track persons or objects of interest can have value in security, commerce, marketing, efficiency monitoring, or other applications. The use of pre-existing light or luminaire systems to effect such monitoring or tracking enables the acquisition of information in a manner that is unobtrusive and comprehensive.

While the following examples are described chiefly with respect to the tracking of persons, it should be readily apparent that the examples herein are not so limited. The following examples may alternatively or simultaneously be used to track objects, e.g., movable objects (such as carts, pallets, merchandise, or other objects that are similarly movable on their own wheels or upon lift and transport thereof by a person or mechanism at a particular premises). Such movable objects have wireless electronic devices with identification information attached or otherwise coupled thereto for tracking purposes. The generation of a visual signature of such objects, and the obtaining of identification information from such objects, may be performed in the same manner discussed herein with respect to the tracking of persons.

The lighting devices under consideration here may be applied to any indoor or outdoor region or space that requires at least some illumination. The lighting equipment involved here may provide the main illumination component in the space, rather than ancillary light output as might be provided by a display, or by or in association with a sound system, or the like. As such, the illumination from one or more of the fixtures, lamps, luminaires, daylighting equipment or other types of lighting devices is the main illumination that supports the purpose of the space, for example, the lighting that provides illumination sufficient to allow occupants in the space to perform the normally expected task or tasks associated with the planned usage of the space. Herein, such lighting is referred to as "general" lighting or "general" illumination.

The various examples disclosed herein relate to a lighting device with image capture capabilities that is configurable to obtain a visual signature of a person in the area under illumination, and to associate that visual signature with separately received identification information that may be applicable to the person. The visual signature includes image information of the person obtained from an image of the area under illumination. The identification information is received from a wireless device of or in the vicinity of the person via a wireless transceiver of the light device.

The term "lighting device" as used herein is intended to encompass essentially any type of device that processes, generates, or supplies light, for example, for general illumination of a space intended for use of or occupancy or observation, typically by a living organism that can take advantage of or be affected in some desired manner by the light emitted from the device. However, a lighting device may provide light for use by automated equipment, such as sensors/monitors, robots, etc. that may occupy or observe the illuminated space, instead of or in addition to light provided for an organism. It is also possible that one or more lighting devices in or on a particular premises have other lighting purposes, such as signage for an entrance or to indicate an exit. Of course, the lighting devices may be configured for still other purposes, e.g. to benefit human or non-human organisms or to repel or even impair certain organisms or individuals. In most examples, the lighting device(s) illuminate a space or area of a premises to a level useful for a human in or passing through the space, e.g. regular illumination of a room or corridor in a building or of an outdoor space such as a street, sidewalk, parking lot or performance venue. The actual source of light in or supplying the light for a lighting device may be any type of light emitting, collecting or directing arrangement. The term "lighting device" encompasses passive lighting devices that collect and supply natural light as well as artificial lighting devices include a source for generating light upon consumption of power.

The term "passive lighting" as used herein is intended to encompass essentially any type of lighting that a device supplies without consuming power to generate the light. A passive lighting device, for example, may take the form of a daylighting device (such as a skylight or window) that supplies daylight that the device obtains outside a structure to the interior of the structure, e.g. to provide desired illumination of the interior space within the structure with otherwise natural light. As another example, a passive lighting device may include a phosphor or other wavelength conversion material, to enhance the light in a desired manner without consuming electrical power. A passive lighting device, however, may be combined with other elements that consume electrical power for other purposes, such as communications, data processing and/or modulation of otherwise passive lighting. For example, a modulated passive lighting device is a lighting device having a passive optical element and an associated optical modulator to modulate light supplied in some manner via the passive optical element, albeit without any consumption of power to generate the light to be supplied for illumination purposes (although power may be consumed to modulate passively obtained light).

The term "artificial lighting" as used herein is intended to encompass essentially any type of lighting that a device produces light by processing of electrical power to generate the light. An artificial lighting device, for example, may take the form of a lamp, light fixture or other luminaire that incorporates a source, where the source by itself contains no intelligence or communication capability, such as one or more LEDs or the like, or a lamp (e.g. "regular light bulbs") of any suitable type.

The term "coupled" as used herein refers to any logical, physical, optical or electrical connection, link or the like by which forces, energy, signals or other actions produced by one system element are imparted to another "coupled" element. Unless described otherwise, coupled elements or devices are not necessarily directly connected to one another and may be separated by intermediate components, elements or communication media that may modify, manipulate or carry the signals. The "coupled" term may apply to either one or both of optical coupling and electrical coupling. For example, an image sensor may be optically coupled to a lens or the like, whereas a processor or the like may be coupled to control and/or exchange instructions or data with the sensor or with other elements of a device or system via electrical connections, optical connections, electromagnetic communications, etc.

Figure 1B:
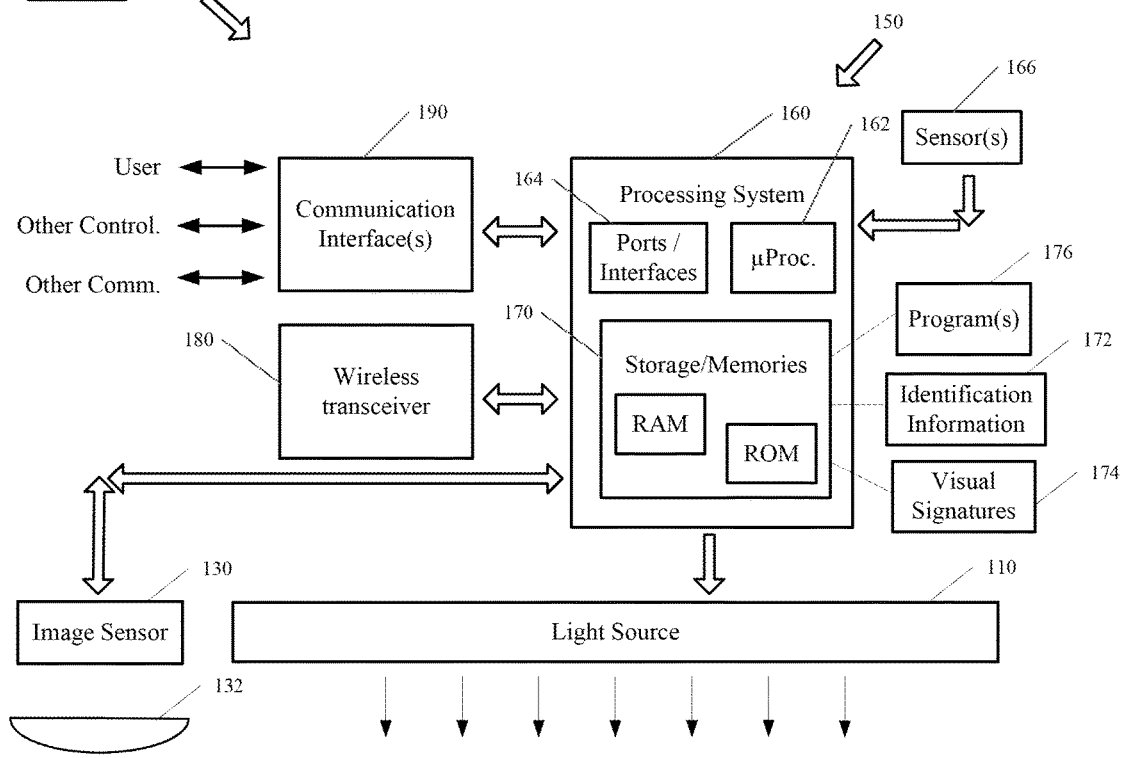
FIG. 1B is a high-level block diagram of a lighting device.

Reference now is made in detail to the examples illustrated in the accompanying drawings and discussed below. FIGS. 1A and 1B illustrate an example of a lighting device 100. As a general overview, lighting device 100 may include a light source 110, an image sensor 130, and a controller 150 (FIG. 1B). Additional details regarding lighting device 100 are set forth below.

Light source 110 outputs light. Virtually any source of natural or artificial light may be used as light source 110. Light source 110 may be integrated into lighting device 100, such as in a luminaire, or may be a source of (natural or artificial light) separate from lighting device 100. If lighting device 100 is a luminaire, light source 110 may be configured to emit light of intensity and other characteristics appropriate for artificial general illumination. A variety of suitable light generation sources are indicated below.

Suitable light generation sources for use as light source 110 include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used to implement the source 110.

Light source 110 may use a single emitter to generate light, or light source 110 may combine light from some number of emitters that generate the light. A lamp or 'light bulb' is an example of a single source; an array of LEDs is an example of multiple light emitters. An LED light engine may provide a single output for a single source but typically combines light from multiple LED type emitters within the single engine.

Image sensor 130 acquires image data. Image sensor 130 is oriented in the same direction as light source 110, so that image sensor 130 can acquire an image of a portion or all of an area illuminated by light source 110. Where light source 110 incorporates a single light emitter, image sensor 130 may be positioned side by side with light source 110. Where light source 110 incorporates multiple or an array of light emitters, image sensor 130 may be integrated within the emitters of light source 110, as shown in FIG. 1A. Although shown approximately in the center of the light source light source 110, the image sensor 130 may be located at other positions within the area of the source (e.g. at or near a side or corner) or at other positions on the luminaire (e.g. as part of a bezel or end cap). Also, the lighting device may include one or more additional image sensors of the same or a different type.

A variety of suitable image sensors are available. A high-resolution image sensor may be utilized when detailed image information is desired, e.g. to better discern the facial features of a person being monitored. Alternatively, a low-resolution image sensor may be utilized when detailed image information is not required, or due to privacy concerns. Color, gray-scale or black and white image sensors may be used. Image sensors may capture images in various ways, e.g. via line scanning, rolling shutter, global shutter, etc. Also, the image sensor may be sensitive to some or all of the visible light portion of the spectrum alone or in combination with one or more other regions of the spectrum (e.g. infrared and/or ultraviolet). The present discussion also encompasses both still frame and video cameras for use as the image sensor.

One or more lenses 132 may also be provided to focus light from the area being illuminated onto image sensor 130. Lens 132 may be a conventional camera lens or may be a fisheye lens, and may be selected based on the required level of detail in the image information to be acquired, and/or on the size of the area being illuminated by light source 110. It will also be understood that other structures may be used for redirecting light toward image sensor 130, for example by reflection, refraction, or diffraction. Such other structures may include, for example, diffractive gratings integrated with the image sensor, or nano-scale antenna arrays for directing light onto the image sensor.

Lighting device 100 is not size restricted. For example, each device 100 may be of a standard size, e.g., 2-feet by 2-feet (2×2), 2-feet by 4-feet (2×4), or the like, and arranged like tiles for larger area coverage. Alternatively, lighting device 100 may be a larger area device that covers a wall, a part of a wall, part of a ceiling, an entire ceiling, or some combination of portions or all of a ceiling and wall.

FIG. 1B provides an example of a controller 150 that may be used in lighting device 100. Controller 150 is coupled to control light source 110 to provide general illumination application. Controller 150 is further coupled to control image sensor 130 to acquire an image of the area under illumination, and to receive the image from image sensor 130. As a general overview, controller 160 includes a processing system 160, a memory 170, and a wireless transceiver 180.

The processing system 160 provides the high level logic or "brain" of lighting device 100. In the example, the processing system 160 is coupled with image sensor 130, wireless transceiver 180, and communication interface(s) 190. Processing system 160 includes a central processing unit (CPU), shown by way of example as a microprocessor (μP) 162, although other processor hardware may serve as the CPU. Processing system 160 also includes memory 170, which may include a random access memory and/or a read-only memory.

Ports and/or interfaces 164 couple the microprocessor 162 to various other elements of the lighting device 100, such as image sensor 130, other sensors 166 (such as motion or thermal sensors), wireless transceiver 180, and/or communication interface(s) 190. For example, microprocessor 162 controls operation of the lighting device 100 via one or more of the ports and/or interfaces 164. In a similar fashion, one or more of the ports 164 enable microprocessor 162 of the processing system 160 to use and communicate externally via communication interface(s) 190; and the one or more of the ports 164 enable microprocessor 162 of the processing system 160 to receive data regarding any condition detected by a sensor 166, for further processing. External communication by communication interface(s) 190, or communication within the internal components of lighting device 100, may be accomplished by any known manner of communication, including electrical communication, optical communication (such as visible light communication (VLC) or fiber optic communication), electromagnetic communications, or others.

Processing system 160 of controller 150 provides a number of functions for monitoring and/or tracking persons within the area illuminated by light source 110. In a typical example, processing system 160 operates wireless transceiver 180 to receive identification information 172 from a wireless device in the area illuminated by light source 110. Wireless transceiver 180 may be a personal area network transceiver operating using Bluetooth or Bluetooth Low Energy communication standards. Such a wireless transceiver may be operated by processing system 160 to obtain an identification of any Bluetooth enabled wireless device (such as a mobile phone) within the area illuminated by light source 110. Other wireless transceivers or receivers may be used, such as wireless internet or telephone transceivers, to actively or passively detect or request and receive other types of identifier that a mobile device may use for its normal wireless communication operations, such as for its WiFi or cellular communication.

Processing system 160 also automatically generates a visual signature 174 from an image captured by the image sensor 130. The visual signature 174 includes image information of a person of interest obtained from the image of the illuminated area acquired by image sensor 130. Processing system 160 may be capable of identifying a portion of the image containing the wireless device from which the wireless device identification information 172 was received, and using that portion of the image to generate the visual signature. Such detection may be possible by monitoring changes in the image obtained by image sensor 130, e.g. in order to detect movement in the area under illumination, or may be possible using other sensors 166 (such as thermal sensors).

While the signature is referred to as "visual," it will be understood that visual signature 174 is not limited solely to information collected from humanly visible light. To the contrary, visual signature 174 may include signature information obtained from other types of non-visible light information about the person or object of interest, such as information obtained from ultraviolet or infrared light. Suitable wavelengths of electromagnetic radiation for tracking persons or objects of interest and generating the visual signature, as well as image sensors for obtaining such electromagnetic radiation, should be readily apparent from review and consideration the description herein.

As used herein, the "automatic" action of processing system 160 is one that is not performed in response to a signal or instruction from a human operator. Instead, processing system 160 may periodically obtain a visual signature 174, or may obtain a visual signature 174 according to the instructions of one or more programs 176 stored in memory 170. For one example, processing system 160 automatically generates a visual signature 174 responsive to receiving wireless device identification information 172 via wireless transceiver 180. For another example, processing system 160 automatically generates a visual signature 174 responsive to a detection of a person of interest in the area illuminated by light source 110.

A full or partial image could be captured as a signature. In most examples, however, the signature is a collection of parsed data about a number of detectable physical features of the person extracted from the image, where the features (and thus the selected feature data) are sufficient to adequately distinguish the person from other persons occupying or moving through the space and from other persons within the illuminated space. Features extracted from one or more images to create the digital signature could include the person's size, hair color, facial features, clothing type or color, for example. The signature could be generated from a selected subset of image data from one image or from a number of images. Alternatively, the signature could utilize data about selected points in the image and relationships (e.g. distances and angles) between such points and/or outline(s) of one or more subject portions of the person in the image (e.g. an outline of the shape of the face). Various combinations of such feature data and/or other notable data about the person extracted from an image may be used to form the signature to adequately identify a person.

In order to extract facial features from images to create the digital signature (as set forth above), facial recognition algorithms may be employed. Suitable facial recognition algorithms may include, for example, the use of eigenfaces. It will be understood that when facial recognition algorithms are employed, it may be necessary that image sensor 130 be a high-resolution image sensor in order to properly identify facial features.

In particular, a 3D high-resolution image sensor may provide improved detection of physical features of the person being tracked, including facial features. In addition to the use of a 3D camera in facial recognition algorithms, additional physical features such as head size, torso shape, etc. can also be tracked and utilized to generate the visual signature. Alternatively, 3D image information usable for generating visual signatures may also be generated using 2D image sensors on multiple spatially distributed lighting devices 100. Suitable processes for generating 3D image information using multiple spatially distributed 2D image sensors are available, and may include, for example, photogrammetry.

In addition to 2D and 3D image sensors, thermal image sensors having sufficient resolution may be capable of detecting heat signatures of persons to be tracked (e.g. from the person's head). Such thermal image information may be used alone or in combination with other image information to generate the visual signature.

Additionally, visual signatures may be created using a "base image" of an area under illumination. As individuals enter and/or move through the area, changes (or deltas) from the base image may be identified (e.g. by changes in detected pixels) and then used to create the visual signature. As the changes move through the area, the visual signature can be tracked and updated. This particular approach for generating visual signatures may be suitable for use when image sensor 130 is a low-resolution image sensor. The changes identified by such a low-resolution image sensor may lack the precision or detail set forth above, for example, relating to facial recognition. Such changes may instead be directed to broader categories of information, such as movements of particular colors or shapes, or the movement of some featureless spot, through the underlying base image.

The amount and resolution of the data used for signature formation, for example, may depend on the use of the signature and the attendant requirements for accuracy and system performance. For example, for general tracking of movement of a person shopping in a retail space using a visual signature and a mobile device identification, data storage and communication and processing speeds during tracking of a large number of shoppers and/or store personnel may be more significant concerns than accuracy of every individual's identification. In such a case, the quality and amount of data used in the signature may be somewhat low in terms of the ability to resolve signatures of different people. Conversely, for tracking at a secure location, accurate identification of individuals may be more important; in which case, the system uses features of higher quality and in greater numbers (requiring more data and more associated processing) to generate and compare signatures for more accurate recognition.

The process for creating the visual signature 174 is dependent on the type of image sensor 130 used within lighting device 100 and intended performance parameters, such as degree of accuracy of identification versus suitable signature file size and amount of processing required for signature formation, searches and comparisons. Where a high-resolution image sensor 130 is used, enough detail may be obtained to use facial recognition algorithms to identify selected facial features such as eyes, nose, mouth, etc. and generate data about those features from the image to form the basis of the visual signature. Where a low-resolution image sensor 130 is used, the visual signature may be created based on the differences that presence of the person in the space creates from a baseline image of the area under illumination (taken, for example, when the area is unoccupied). In this later example, the size or shape of the person, and/or the color of the person's clothing or items, may be used as part of or to form the visual signature.

Regardless of the type of image sensor and/or signature generation algorithm used, each visual signature 174 may be continuously updated by processing system 160 as the person or persons corresponding to the visual signature moves about the area under illumination and/or from area to area illuminated by various light source/devices in the space of the premises. This updating enables the tracking of each person's movements, as well as tracking if the person's appearance changes to a degree identifiable by processing system 160.

The wireless device identification information 172 and the visual signature 174 may be stored by processing system 160 in memory 170 and/or communicate for use/storage in other lighting devices or equipment. Where processing system 160 determines in accordance with its programming 176 that the visual signature 174 is to be associated with identification information 172, processing system 160 stores visual signature 174 in association with the identification information 172 in memory 170 (e.g. in a common file, or as part of a single data object).

Processing system 160 may be configured to store multiple different visual signatures in association with different identification information in memory 170. As discussed more later, lighting devices at a particular premises or facility share mobile identifications and associated visual signatures related to people the lighting devices detect within the premises or facility. When multiple different visual signatures or identifications are stored, processing system 160 may further be configured to determine whether newly received information matches any existing information in storage. For one example, processing system 160 compares a new image obtained by image sensor 130 with stored visual signatures, and determines whether the information in any of the stored visual signatures matches any portion of the image obtained by image sensor 130. For another example, processing system 160 compares newly acquired wireless device identification information with stored wireless device identifications, and determines whether a match exists. Such matches in visual signatures or wireless device identification information may be useful for tracking a previously identified person of interest in the area illuminated by light source 110. Checking of both signatures and mobile device identifications also enables checking of correlations between people and mobile devices, e.g. to determine if a person is still carrying the same mobile device as when first detected.

The wireless device identification information 172 and the visual signature 174 may further be transmitted to a remote location by processing system 160. In one example, communication interface(s) 190 incorporates a wired or wireless transceiver that provides a connection to an remote location, such as an external controller or one or more other lighting devices. Processing system 160 transmits the wireless device 172 and visual signature 174 using the transceiver of communication interface 190. The information may be transmitted to other lighting devices (where a system of lighting devices is provided) and/or to a central location for storage and/or monitoring.

Devices that implement functions like those of lighting device 100 may take various forms. In some examples, some components attributed to the lighting device 100 may be separated from the light source 110 and the image sensor 130. For example, an apparatus may have all of the above hardware components on a single hardware device as shown in FIGS. 1A and 1B, or in different somewhat separate units. In a particular example, one set of the hardware components may be separated from the light source 110 and the image sensor 130, such that the controller 150 may run a system of light sources and image sensors from a remote location. Also, one set of intelligent components, such as the microprocessor 162, may control/drive some number of light sources 110 and image sensors 130 (via communication interfaces 190 on each lighting device 100). It also is envisioned that some lighting devices may not include or be coupled to all of the illustrated elements, such as the sensor(s) 166 and the communication interface(s) 190. For convenience, further discussion of the lighting device 100 will assume an intelligent implementation of the device that includes at least the components illustrated in FIGS. 1A and 1B.

Figure 2:
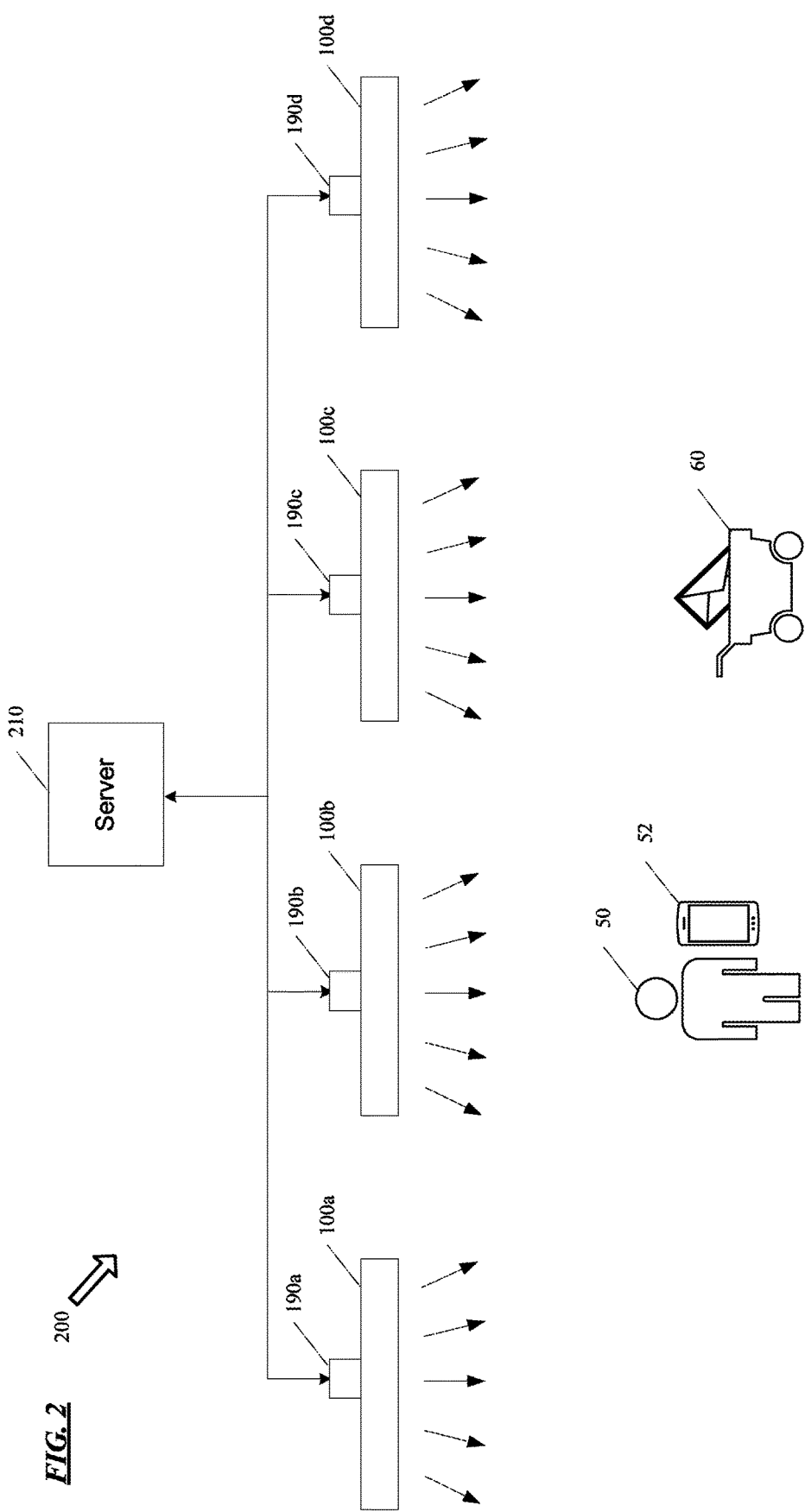
FIG. 2 is a diagram illustrating a system for providing general illumination to an inhabitable area that may be achieved using the lighting device of FIGS. 1A and 1B.

FIG. 2 includes a system 200 of lighting devices. System 200 includes multiple lighting devices 100a, 100b, 100c, 100d, each having the components described above for lighting device 100. While four lighting devices are illustrated, it will be understood that system 200 may include any number of lighting devices as desired to adequately illuminate the region in which system 200 is located.

Lighting devices 100a, 100b, 100c, 100d are configured to exchange information with one another. In one example, each lighting device 100a, 100b, 100c, 100d includes a respective communication interface 190a, 190b, 190c, 190d, which enables data communication between the respective lighting devices, or with a central server 210. Central server 210 may be configured to perform some or all of the processing steps/algorithms described with respect to the lighting devices, and/or may be configured to store any or all of the visual signatures, identification information, or other data acquired or generated by each lighting device 100a, 100b, 100c, 100d. For example, accumulation of data regarding visual signatures and mobile device identifications, with timestamps, as a person or object is sensed by various lighting devices 100 throughout a facility, enables the server 210 to compile a tracking record (using known locations of lighting devices) for places the person or object traveled to and possibly how long they lingered at various points and to compute an estimate of the person or object's path as they moved about the facility. The data communication between the lighting devices and/or with central server 210 may be made wirelessly or over wires, depending on the form of the communication interface.

In system 200, visual signatures and/or wireless identification information may be exchanged between lighting devices. For example, the controller of one lighting device 100b may automatically generate a visual signature for a person 50, and associate the visual signature of the person 50 with wireless device identification information from that person's mobile phone 52, substantially as described above. This lighting device 100b may then transmit the visual signature and associated wireless device identification information to one or more of the other lighting devices 100a, 100c, 100d. The other lighting devices receiving the visual signature and associated wireless device identification information may compare this information to previously stored information to determine whether the newly received information matches any existing information stored at the lighting device, as described above. Any of the other lighting devices 100a, 100c, 100d determine that the associated visual signature and wireless device identification information are new may store the signature and wireless device identification for future use.

For another example, the controller of one lighting device 100c may automatically generate a visual signature for an object, such as a cart 60, and associate the visual signature of the cart 60 with wireless device identification information from a wireless device (such as a tablet) mounted on the cart. This lighting device 100c may then transmit the visual signature and associated wireless device identification information to one or more of the other lighting devices 100a, 100b, 100d. The other lighting devices receiving the visual signature and associated wireless device identification information may compare this information to previously stored information to determine whether the newly received information matches any existing information stored at the lighting device, as described above.

A number of operation examples of lighting device 100 are illustrated in the drawings, and described below.

Figure 3A:
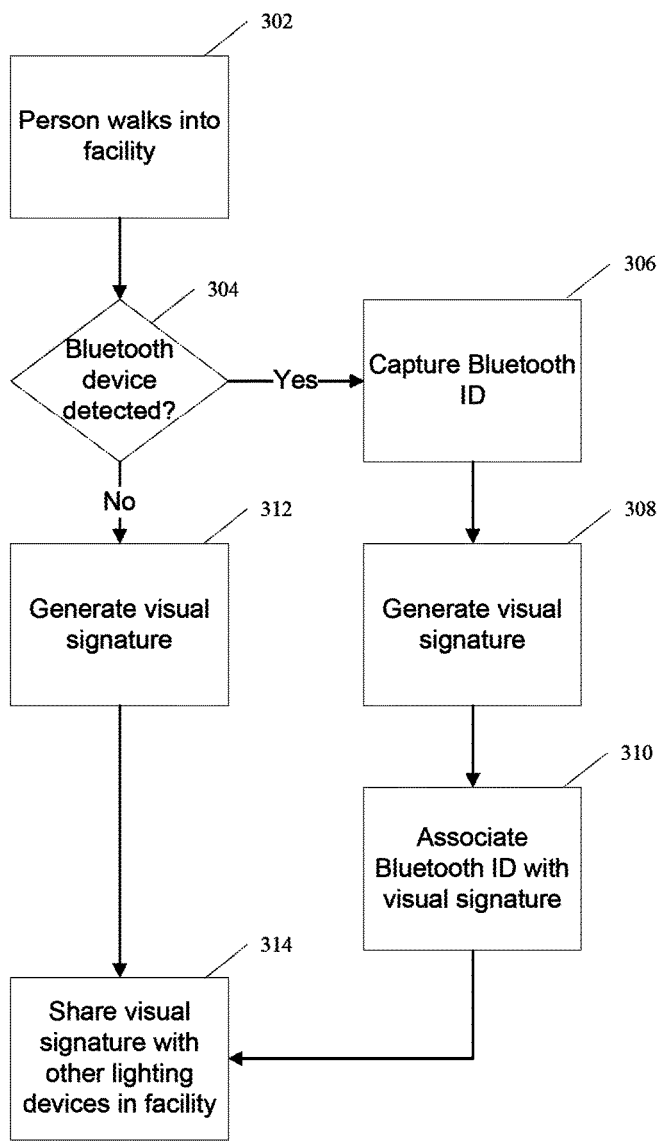
FIGS. 3A and 3B are high-level flow charts illustrating a method for tracking a person or object using the system of FIG. 2.

FIG. 3A provides one example for obtaining information regarding a person using a system of lighting devices 100. In step 302, a person walks into a facility containing the system of lighting devices 100, which provide general illumination for the facility. In step 304, it is determined whether the controller 150 of one lighting device detects the presence of a Bluetooth-enabled wireless device using wireless transceiver 180. If so, the Bluetooth ID is captured by the lighting device using wireless transceiver 180 in step 306. Following acquisition of the Bluetooth ID, a visual signature of the person is captured in step 308, using the sensor 130 and the appropriate signature generation algorithm for processing by system 160. The Bluetooth ID is associated with the visual signature in step 310. If no Bluetooth-enabled device is detected, the lighting device generates a visual signature of the person in step 312. In step 314, once a visual signature has been generated, the lighting device shares the visual signature (with or without an associated Bluetooth ID) with other lighting devices in the facility.

Figure 3B:
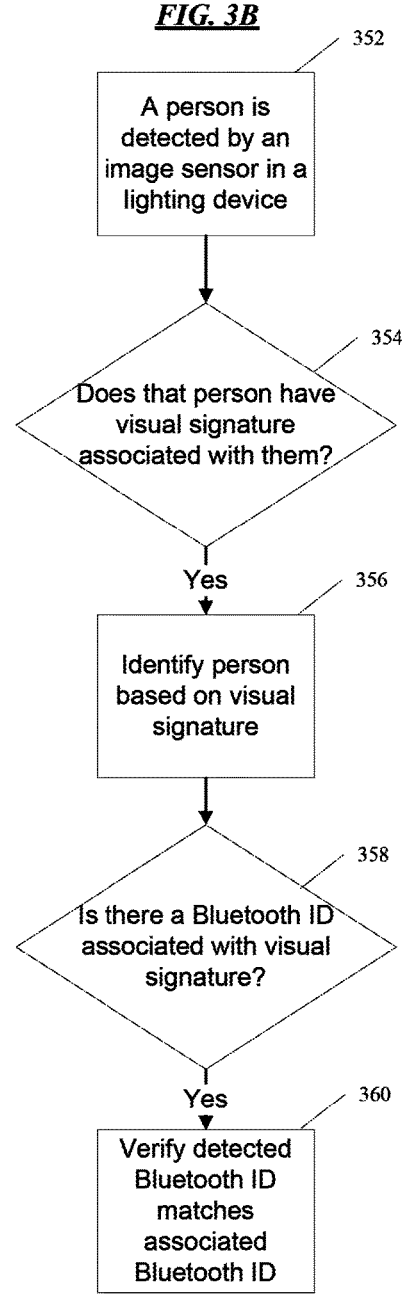

FIG. 3B provides an example for tracking a previously identified person. In step 352, a person is detected by the image sensor 130 of a lighting device 100 in the facility. In step 354, it is determined from the image obtained by the image sensor 130 whether that person already has a visual signature associated with them and stored in the memory of the lighting device. If so, the person may be positively identified based on the previously stored visual signature, in step 356. It is then determined in step 358 whether the positively identified person also has a Bluetooth ID associated with their visual signature. If so, the lighting device 100 may verify whether a detected Bluetooth ID for the person matches the stored Bluetooth ID associated with that person's visual signature. This matching of associated visual signature and wireless device identification information at different lighting devices 100 enables detection of the person at different areas illuminated by the different lighting devices 100 and thus tracking movement of the person throughout the facility.

Figure 4:
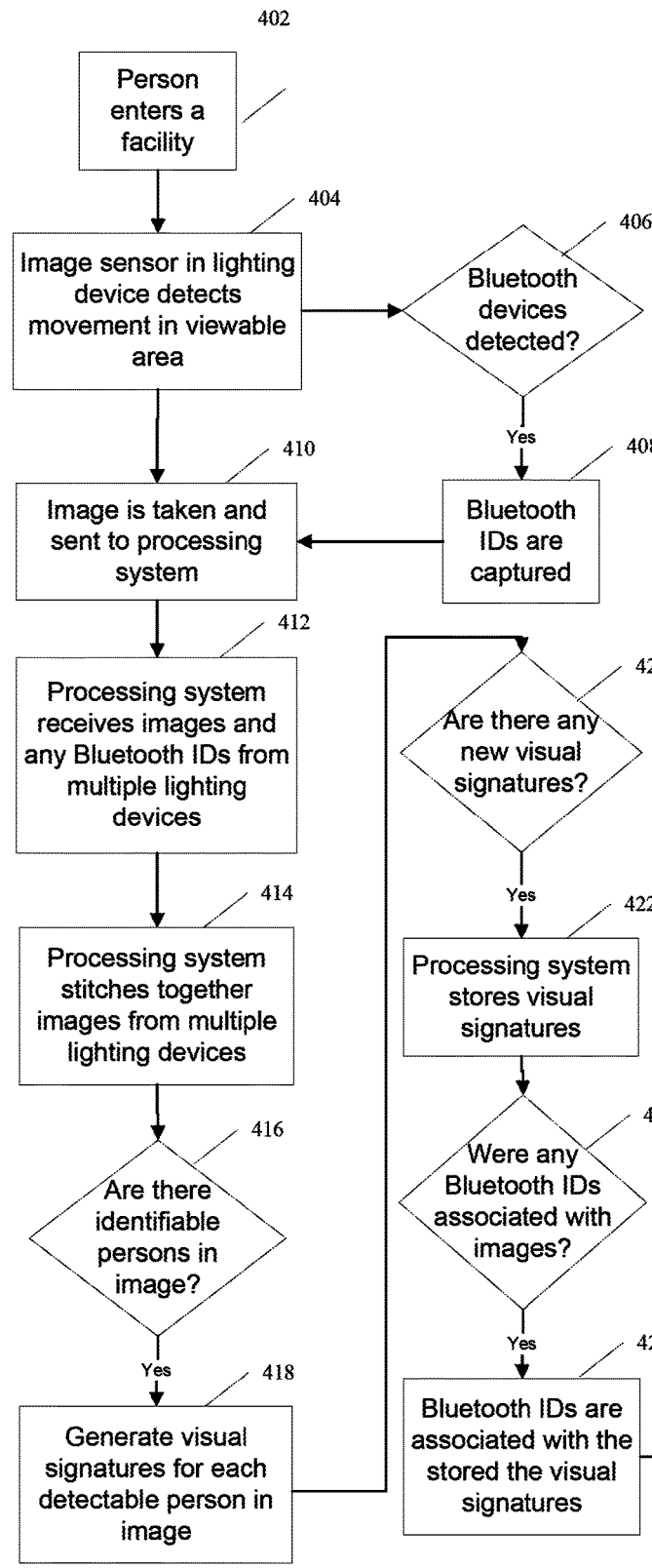
FIG. 4 is a high-level flow chart illustrating another method for tracking a person or object using the system of FIG. 2.

FIG. 4 provides another example for identifying a person in a facility using a system of lighting devices 100. In step 402, a person enters a facility containing the system of lighting devices 100, which provide general illumination for the facility. In step 404, one lighting device detects movement in the area under illumination (either using image sensor 130 or with a particularized motion sensor 166). In response to detecting such movement, it is determined in step 406 whether any Bluetooth-enabled devices are detected, and if so, Bluetooth identifications (IDs) are captured using wireless transceiver 180 in step 408 for each device. Regardless of whether Bluetooth identification information is obtained, in step 410, an image is captured by the image sensor 130 of the area in which the movement was detected, and the image is sent to processing system. The processing system may be the processing system of the lighting device that captured the image, another lighting device in the system, or may be part of a centralized server in communication with each lighting device in the system.

In step 412, the processing system receives images and any Bluetooth identification information from multiple lighting devices in the facility. In step 414, the processing system stitches together images from the multiple lighting devices in order to obtain a complete image of the area under illumination. In step 416, the processing system determines whether a person is present in the stitched together image. In step 418, visual signatures are generated for each detectable person in the stitched together image. Persons may be detected in the stitched together image due to differences between consecutive stitched together images, the differences resulting from movement of the person(s) within the areas being illuminated within the space of the facility. Example image processing methods for use by the processing system are described in U.S. Pat. No. 5,649,032, entitled "System for automatically aligning images to form a mosaic image," the contents of which are incorporated herein by reference in their entirety for all purposes.

In step 420, it is determined whether any of the visual signatures generated match previously stored visual signatures, or are new visual signatures. If new visual signatures have been generated, they are stored in memory in step 422. In step 424, it is then determined whether any Bluetooth identification information was associated with any of the new visual signatures. If so, the processing system stores the Bluetooth identification information in association with the stored visual signatures in step 426.

In step 428, the current location of the stored visual signatures is updated. This information may be obtained from the location of the lighting device that obtains the image containing the visual signature, and/or from the location in the image of the person corresponding to the visual signature. In step 430, it is determined by the processing system whether a Bluetooth identification is associated with the visual signatures. If so, in step 432, the system of lighting devices determines whether the Bluetooth identifications for each visual signature are still within a predetermined range of the visual signature's location. The location of the respective Bluetooth devices may be determined based on the location of the lighting device that obtains the Bluetooth identification.

If a Bluetooth identification is found to be separated from the current location of the visual signature (if for example one lighting device obtains an image of the person, but a separate lighting device detects that person's mobile phone), the processing system makes a record of the inconsistency in step 434. If a sufficient number of inconsistencies occurs, then in step 436, it may be determined that the association between the Bluetooth identification and the visual signature which is stored in memory is inaccurate. If this is the case, the system disassociates the Bluetooth identification from the visual signature in step 438.

The dissociation of the Bluetooth identification from the visual signature in step 438 may be permanent or temporary within the system of lighting device 100. In one example, the identification information and visual signature may be temporarily dissociated from one another, e.g., for a predetermined period of time. Following this predetermined period of time, it may be determined whether the identification information and visual signature have been rejoined; and if so, the identification information and visual signature are re-associated or rejoined in memory accordingly. The use of temporary separation and rejoinder of visual signature and identification information may be useful to account for certain situations, for example, scenarios in which the person being tracked has temporarily given their mobile phone to another person.

Figure 5:
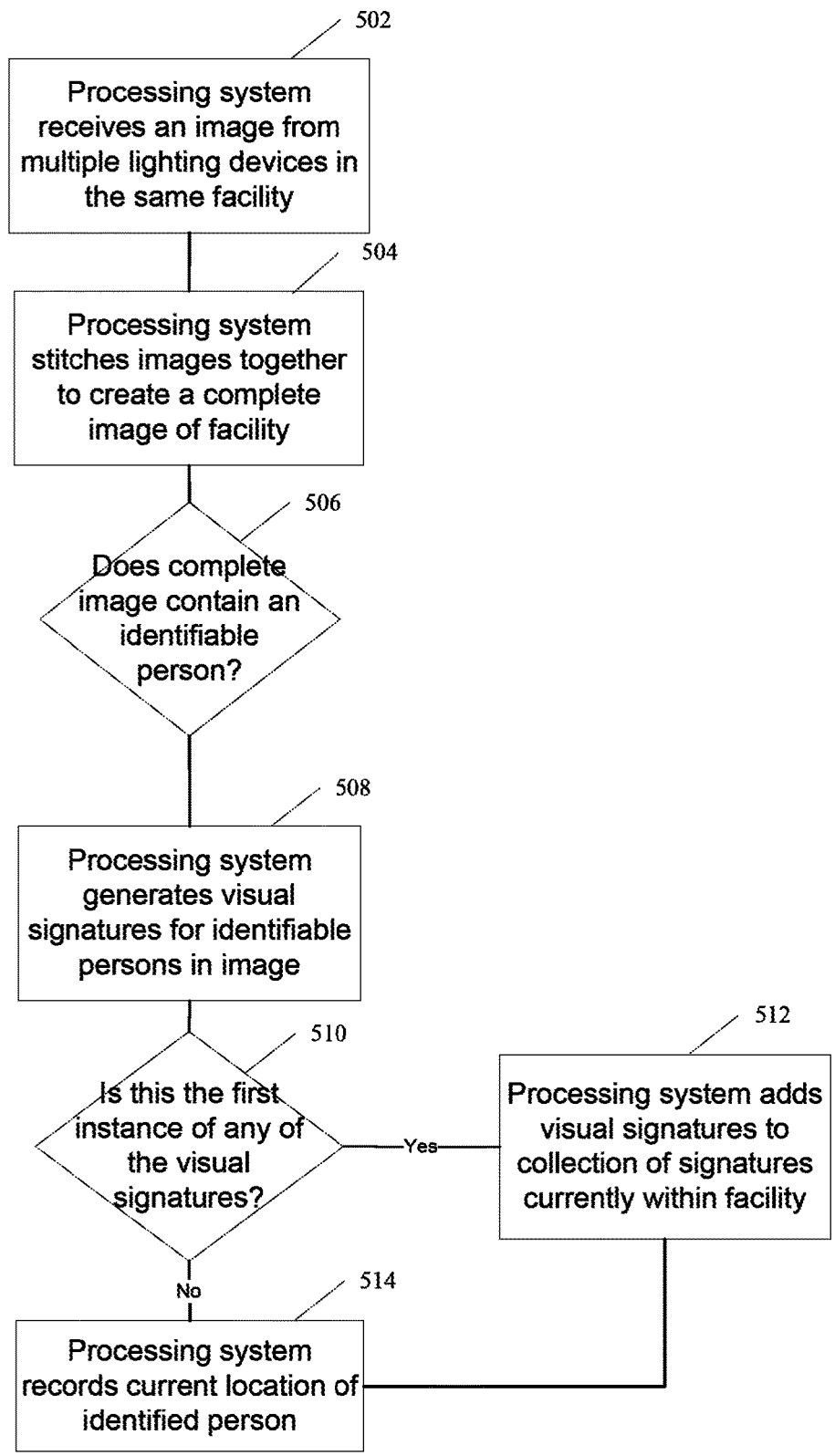
FIG. 5 is a high-level flow chart illustrating a method for creating a visual signature of a person or object using the system of FIG. 2.

FIG. 5 provides an example for creating a visual signature of a person in a facility using a system of lighting devices 100. In step 502, an processing system receives images from multiple lighting devices in a region. The processing system may be the processing system of one lighting device (e.g. designated for this processing task), may be the processing systems of two or more of the lighting devices (e.g. handling the processing task on a distributed processing basis), or may be part of a centralized server in communication with each lighting device in the system. In step 504, the processing system stitches the images from the lighting devices together to create a complete image of the region being illuminated by the lighting devices.

In step 506, it is determined whether the stitched-together image contains a person who may be identified. If so, in step 508, the processing system creates a visual signature for each identifiable person. In step 510, it is determined whether the visual signatures created for each person match any previously stored visual signatures, or whether the created visual signatures are for new persons. If the visual signatures are new, the processing system stores the visual signatures in a record of signatures currently within the facility in step 512. If the visual signatures match previously stored visual signatures, then the current location of the person corresponding to that visual signature is updated in step 514.

Figure 8:
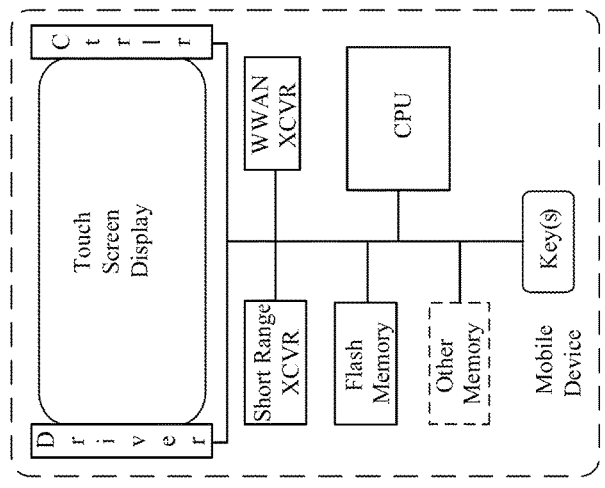
FIG. 8 is a simplified functional block diagram of a mobile device, as an alternate example of a user terminal device, for possible communication with or identification by a lighting device.
Figure 7:
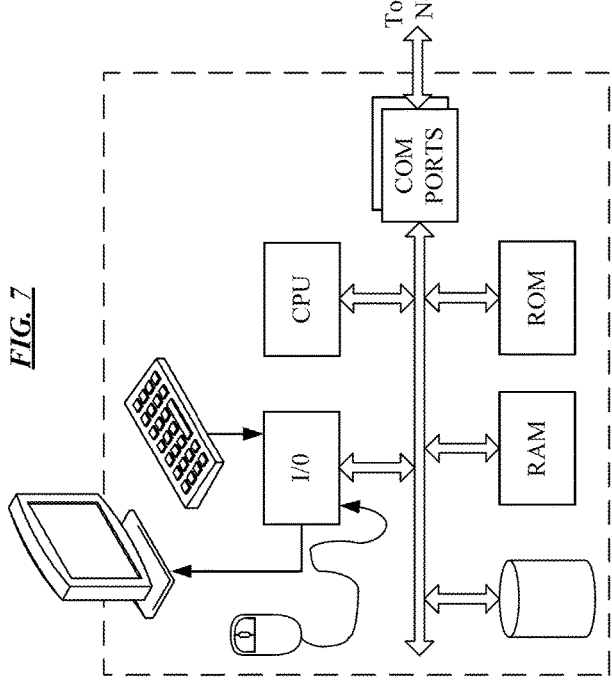
FIG. 7 is a simplified functional block diagram of a personal computer or other similar user terminal device, which may communicate with a lighting device.
Figure 6:
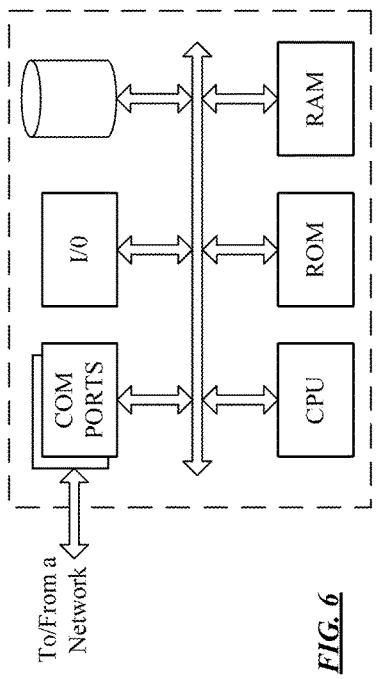
FIG. 6 is a is a simplified functional block diagram of a computer that may be configured as a host or server, for example, to receive image information, visual signatures, or other data from a lighting device.

FIGS. 6 to 8 provide functional block diagram illustrations of general purpose computer hardware platforms. FIG. 6 illustrates a network or host computer platform, as may typically be used to implement a server, such as server 210 in system 200. FIG. 7 depicts a computer with user interface elements, as may be used to implement a personal computer or other type of work station or terminal device, although the computer of FIG. 7 may also act as a server such as server 210 if appropriately programmed. It is believed that those skilled in the art are familiar with the structure, programming and general operation of such computer equipment and as a result the drawings should be self-explanatory. FIG. 8 shows an alternative implementation of a user terminal device for client type operations, in the form of a mobile device, which may act as mobile phone 52.

A server, for example (FIG. 6), includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load. For example, functions of generating visual signatures on the server may be performed separately from tracking or monitoring functions, such as comparing newly acquired visual signatures or identification information to stored information.

A computer type user terminal device, such as a personal computer or the like, similarly includes a data communication interface CPU, main memory and one or more mass storage devices for storing user data and the various executable programs (see FIG. 7). A mobile device type user terminal (see FIG. 8) may include similar elements, but will typically use smaller components that also require less power, to facilitate implementation in a portable form factor. The various types of user terminal devices will also include various user input and output elements. A computer terminal device (see FIG. 7), for example, may include a keyboard and a cursor control/selection device such as a mouse, trackball, joystick or touchpad; and a display for visual outputs, which may allow an operator of the disclosed systems to review or interact with the stored data, in the form of lists of identification information or arrays of visual signatures with associated stops or dwell times or even a map of the facility overlaid with estimated paths of travel of people the system tracked. Many newer examples of such terminal devices also include touchscreens. A microphone and speaker enable audio input and output. Some mobile devices include similar but smaller input and output elements. Tablets, smartphones and other types of mobile devices often utilize touch sensitive display screens, (see FIG. 8) instead of separate keyboard and cursor control elements. The hardware elements, operating systems and programming languages of such user terminal devices also are conventional in nature, and it is presumed that those skilled in the art are adequately familiar therewith.

Hence, aspects of the methods of monitoring and/or tracking persons of interest using the system of lighting devices outlined above may be embodied in programming, for a server computer, a user terminal client device and/or the lighting device. Such programming may contain instructions for performing the processing and/or server functions recited above, including the generation of visual signatures, association of wireless device identification information to visual signatures, or the comparison of newly acquired/generated data with stored visual signatures and/or identification information. Program aspects of the technology may be thought of as "products" or "articles of manufacture" typically in the form of executable code and/or associated data (e.g. configuration information and/or files containing such information) that is carried on or embodied in a type of machine readable medium. "Storage" type media include any or all of the tangible memory of the lighting devices, computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the configuration information and/or applicable programming from one device, computer or processor into another, for example, from a management server or host computer of the store service provider into the computer platform and/or from that store equipment into a particular lighting device, or vice versa. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software, e.g. the programming and/or data. As used herein, unless restricted to non-transitory, tangible "storage" media, terms such as computer or machine "readable medium" refer to any medium that participates in providing instructions to a processor or the like for execution or in providing data (e.g. configuration information) to a processor or the like for data processing.

Hence, a machine readable medium may take many forms, including but not limited to, a non-transitory or tangible storage medium, a carrier wave medium or physical transmission medium. Non-volatile storage media include, for example, optical or magnetic disks, such as any of the storage devices in any computer(s) or the like, such as may be used to implement the image processing functions of the lighting device, or the store server, or the user terminals, etc. shown in the drawings. Volatile storage media include dynamic memory, such as main memory of such a computer platform or other processor controlled device. Tangible transmission media include coaxial cables; copper wire and fiber optics, including the wires that comprise a bus within a computer system or the like. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer or other machine can read programming code and/or data. Many of these forms of computer readable media may be involved in carrying one or more sequences of one or more instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A lighting device, comprising:
   a light source configured to emit light for an area;
   an image sensor configured to acquire an image of the area;
   a wireless transceiver configured to receive identification information from a wireless device in the area; and
   a controller configured to generate a visual signature of a person or object in the area using the image, and associate the visual signature of the person or object with the wireless device identification information.

2. The lighting device of claim 1, wherein the controller is further configured to:
   identify a portion of the image containing the wireless device, and
   generate the visual signature using the portion of the image containing the wireless device.

3. The lighting device of claim 1, wherein the visual signature comprises at least one detectable physical feature of the person or object, extracted from the image of the area, the at least one physical feature being sufficient to adequately distinguish the person or object from another person or object.

4. The lighting device of claim 1, wherein the controller is configured to generate the visual signature responsive to receiving the wireless device identification information.

5. The lighting device of claim 1, wherein the controller is configured to generate the visual signature responsive to a detection of the person or object in the image.

6. The lighting device of claim 1, further comprising another transceiver, the controller being configured to transmit the visual signature and the associated wireless device identification information using the other transceiver.

7. The lighting device of claim 1, further comprising:
   a memory which stores a plurality of visual signatures, wherein
   each visual signature comprises different image information and is associated with different wireless device identification information.

8. The lighting device of claim 7, wherein the controller is configured to:
   determine whether any of the plurality of visual signatures corresponds to a portion of the image.

9. The lighting device of claim 7, wherein the controller is configured to:
  determine whether the wireless device identification information associated with any of the plurality of visual signatures matches the wireless device identification information received by the wireless transceiver.

10. A system, comprising:
  a plurality of lighting devices, each lighting device comprising:
    a light source configured to emit light for an area;
    an image sensor configured to acquire an image of the area;
    a controller coupled to receive the acquired image of the area from the image sensor;
    a first wireless transceiver coupled with the controller, the controller being configured to operate the first wireless transceiver to receive identification information from a wireless device in the area; and
    a second transceiver coupled with the controller, the controller being configured to operate the second transceiver to transmit information between the plurality of lighting devices,
  wherein the controller of one of the plurality of lighting devices is configured to:
  generate a visual signature of a person or object in the area using the image,
  associate the visual signature with wireless device identification information obtained via the first wireless transceiver of the one lighting device, and
  transmit the visual signature and the associated wireless device identification information to at least one other of the plurality of lighting devices via the second transceiver.

11. The system of claim 10, wherein the controller of the one of the plurality of lighting devices is configured to:
  identify a portion of the image containing the wireless device, and
  generate the visual signature using the portion of the image containing the wireless device.

12. The system of claim 10, wherein the visual signature comprises at least one physical feature of the person or object extracted from the image of the area, the at least one physical feature being sufficient to adequately distinguish the person or object from another person or object.

13. The system of claim 10, wherein the controller of the one of the plurality of lighting devices is configured to generate the visual signature responsive to receiving the wireless device identification information.

14. The system of claim 10, wherein the controller of the one of the plurality of lighting devices is configured to generate the visual signature responsive to a detection of the person or object in the image.

15. The system of claim 10, wherein each lighting device further comprises:
  a memory coupled with the controller,
  wherein the at least one other of the plurality of lighting devices stores the visual signature and the associated wireless device identification information in memory.

16. The system of claim 10, wherein the controller of the at least one other lighting device is configured to track the person or object by:
  determining whether the visual signature matches a portion of the image.

17. The system of claim 10, wherein the controller of the at least one other lighting device is configured to track the wireless device by:
  determining whether the identification information associated with the visual signature matches the identification information received via the wireless transceiver of the at least one other lighting device.

18. A method, comprising:
  emitting light to an area with a light source of a lighting device;
  acquiring an image of the area with an image sensor included in the lighting device;
  receiving identification information from a wireless device in the area using a wireless transceiver included in the lighting device;
  generating a visual signature of a person or object in the area using the image; and
  associating the wireless device identification information received by the wireless transceiver with the visual signature of the person or object.

19. The method of claim 18, wherein the generating of the visual signature comprises extracting at least one physical feature of the person or object from the image, the at least one physical feature sufficient to adequately distinguish the person or object from another person or object.

20. The method of claim 18, wherein the generating of the visual signature is performed responsive to the receiving of the wireless device identification information.

21. A lighting device, comprising:
  a light source;
  an image sensor;
  a wireless transceiver;
  a controller coupled to the image sensor and the wireless transceiver, the controller being configured to:
  operate the image sensor to acquire an image of at least a portion of an area illuminated by the light source,
  operate the wireless transceiver to receive information from a wireless device in the area,
  process the image of the area to generate a visual signature of a person or object in the area, and
  associate the visual signature of the person or object with the wireless device information.

* * * * *